US007797833B2

(12) United States Patent
Nakamura et al.

(10) Patent No.: US 7,797,833 B2
(45) Date of Patent: Sep. 21, 2010

(54) DEVELOPING ROLLER AND METHOD OF PRODUCING THE ROLLER, PROCESS CARTRIDGE, AND ELECTROPHOTOGRAPHIC IMAGE-FORMING APPARATUS

(75) Inventors: Minoru Nakamura, Mishima (JP); Yoshiyuki Takayama, Mishima (JP); Kazuaki Nagaoka, Susono (JP); Masaki Yamada, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/614,022

(22) Filed: Nov. 6, 2009

(65) Prior Publication Data

US 2010/0054824 A1 Mar. 4, 2010

Related U.S. Application Data

(63) Continuation of application No. PCT/JP2009/059476, filed on May 18, 2009.

(30) Foreign Application Priority Data

May 30, 2008 (JP) ............................ 2008-143175

(51) Int. Cl.
*B21K 1/02* (2006.01)
*B05C 1/08* (2006.01)
*F16C 13/00* (2006.01)
*G03G 15/08* (2006.01)

(52) U.S. Cl. ........................ 29/895.32; 492/18; 492/17; 492/56; 399/286; 399/111; 399/119

(58) Field of Classification Search ............. 29/895.32, 29/895, 895.2, 895.21, 895.211; 492/17, 492/18, 56, 59, 38; 399/286, 176, 279, 111, 399/119

See application file for complete search history.

(56) References Cited

U.S. PATENT DOCUMENTS

| | | | | |
|---|---|---|---|---|
| 5,047,803 | A * | 9/1991 | Kanoto | 399/111 |
| 6,303,215 | B1 * | 10/2001 | Sonobe et al. | 428/295.4 |
| 6,915,570 | B1 * | 7/2005 | Ohgoshi et al. | 29/895.32 |
| 7,445,588 | B2 * | 11/2008 | Hattori et al. | 492/56 |
| 2003/0096917 | A1 * | 5/2003 | Hattori et al. | 525/403 |
| 2004/0024166 | A1 * | 2/2004 | Hattori et al. | 528/66 |
| 2005/0202946 | A1 * | 9/2005 | Hattori et al. | 492/56 |
| 2007/0111872 | A1 | 5/2007 | Nakamura et al. | 492/53 |
| 2008/0069600 | A1 * | 3/2008 | Nakamura et al. | 399/286 |

(Continued)

FOREIGN PATENT DOCUMENTS

JP 2005-141192 6/2005

(Continued)

*Primary Examiner*—David P Bryant
*Assistant Examiner*—Sarang Afzali
(74) *Attorney, Agent, or Firm*—Fitzpatrick, Cella, Harper & Scinto

(57) ABSTRACT

The present invention intends to provide a method of producing a developing roller capable of providing high-quality electrophotographic images under a variety of environments. The method of producing a developing roller according to the present invention is a method of producing a developing roller having a mandrel, a resin layer on the outer periphery of the mandrel, and a surface layer on the outer periphery of the resin layer, the method including the step of curing a mixture containing a carbon black, a specific diol, and a specific isocyanate compound to form the surface layer.

5 Claims, 3 Drawing Sheets

U.S. PATENT DOCUMENTS

2008/0081277 A1 4/2008 Nakamura et al. ....... 430/111.1
2008/0286016 A1 11/2008 Kawamura et al. .......... 399/286
2009/0290907 A1 11/2009 Kawamura et al. .......... 399/111
2010/0054824 A1 * 3/2010 Nakamura et al. .......... 399/286

FOREIGN PATENT DOCUMENTS

JP 2005-301260 10/2005
JP 2006-139012 6/2006
JP 2006-194989 7/2006
JP 2006-251342 9/2006
JP 2007-163860 6/2007
JP 2008-107819 5/2008

* cited by examiner

DEVELOPING ROLLER AND METHOD OF PRODUCING THE ROLLER, PROCESS CARTRIDGE, AND ELECTROPHOTOGRAPHIC IMAGE-FORMING APPARATUS

CROSS-REFERENCE TO RELATED APPLICATIONS

This application is a continuation of International Application No. PCT/JP2009/059476, filed May 18, 2009, which claims the benefit of Japanese Patent Application No. 2008-143175, filed May 30, 2008.

BACKGROUND OF THE INVENTION

1. Field of the Invention

The present invention relates to a developing roller for use in an electrophotographic image-forming apparatus adopting an electrophotographic mode such as a copying machine, a printer, or the receiving apparatus of a facsimile, and a method of producing the roller.

In addition, the present invention relates to a process cartridge and an electrophotographic image-forming apparatus each of which uses the developing roller.

2. Description of the Related Art

A contact developing method has been known as a method of developing an image in an electrophotographic apparatus. In the contact developing method, an electrostatic latent image formed on a photosensitive drum is carried by the surface of a developing roller abutting the photosensitive drum, and is developed with a developer conveyed to a developing zone.

A developing apparatus to be used in such developing method includes a developer container storing the developer and the developing roller. Further, the apparatus has: a developer supplying roller for supplying the developer in the developer container to the developing roller, the developer supplying roller being placed so as to abut the developing roller; and a developing blade which forms a thin film of the developer on the surface of the developing roller and makes the amount of the developer on the surface of the developing roller constant.

The surface of the developing roller is rubbed with the developing blade. Accordingly, high toughness is requested of the surface of the developing roller. When the surface of the developing roller has poor toughness, the surface of the developing roller is shaved upon long-term use of the developing roller, with the result that an image failure occurs in some cases. Meanwhile, such softness that the developer is not squashed excessively is requested of the surface of the developing roller. When the surface of the developing roller is hard, the developer is squashed with the developing roller, so the melt adhesion of the developer to the surface of the developing roller (filming) may occur upon long-term use of the developing roller. In addition, the filming may cause fog in an image. By the foregoing reasons, a polyurethane resin providing a high-toughness, soft surface layer has been frequently used as a component for the surface layer of the developing roller.

Japanese Patent Application Laid-Open No. 2006-251342 relates to a developing roll including a base rubber layer and a surface layer provided on the base rubber layer and containing a polyurethane resin. In addition, the document discloses the following invention: the surface layer is formed of a resin composition containing a specific polyether group polyol, a specific diisocyanate, and a specific aromatic group two-functional chain extending agent and free of any electron conductive agent so that the resistance of the surface layer to the adhesion of low melting point toner may be improved.

In addition, Japanese Patent Application Laid-Open No. 2005-141192 relates to a developing roller having a conductive elastic layer and a conductive surface layer provided on the conductive elastic layer and containing a polyurethane resin. The document discloses the following invention: the conductive surface layer is formed of a urethane raw material formed of a specific polyurethane polyol prepolymer and a specific isocyanate compound so that a reduction in image density under a low-temperature, low-humidity environment and the peeling of the conductive surface layer under a high-temperature, high-humidity environment may be prevented.

By the way, in recent years, the following ability, which has not been conventionally requested, has been requested of a developing roller including such surface layer containing a polyurethane resin in the field of electrophotography: the roller can exert stable performance even under an extremely severe environment. That is, in an unused process cartridge, a developing roller and a developing blade contact each other at all times with a developer interposed between them in order that the developing blade may be prevented from sticking to the developing roller during the storage of the process cartridge. However, when the process cartridge in such state is left to stand under a high-temperature, high-humidity environment having a temperature of 40° C. and a humidity of 95% RH for a long time period, the developer interposed at the abutting portion of the developing roller and the developing blade often adheres to the surface of the developing roller. The adhering developer continues to adhere to the surface of the developing roller even after the following state: the process cartridge is mounted on an electrophotographic image-forming apparatus so as to be put into use for the formation of an electrophotographic image. As a result, a stripe-like defect called banding often occurs in the electrophotographic image. Such defect can occur in a particularly remarkable fashion in a halftone image. Meanwhile, the developing roller has currently been requested to suppress fog resulting from the filming of the developer which may occur upon formation of an electrophotographic image under a low-temperature, low-humidity environment having a temperature of 10° C. and a humidity of 14% RH (hereinafter simply referred to as "fog").

SUMMARY OF THE INVENTION

In view of the foregoing, the present invention is directed to providing a method of producing a developing roller capable of solving the following problems (1) and (2) at high levels:

(1) the alleviation of the adhesion of a developer to the surface of the developing roller which may occur when a process cartridge in which the developing roller and a developing blade abut each other with the developer interposed between them is left to stand under an environment having a temperature of 40° C. and a humidity of 95% for a long time period (which may hereinafter be simply referred to as "adhesion of the developer"); and (2) the alleviation of "fog" which may occur when the process cartridge is used in long-term formation of an electrophotographic image under an environment having a temperature of 10° C. and a humidity of 14% RH.

Further, the present invention is directed to providing an electrophotographic image-forming apparatus capable of stably outputting high-quality electrophotographic images and a process cartridge to be used in the apparatus.

According to one aspect of the present invention, there is provided a method of producing a developing roller having a mandrel, a resin layer on an outer periphery of the mandrel, and a surface layer on an outer periphery of the resin layer, comprising a step of curing a mixture containing a carbon black, and the following components (a) and (b) and forming the surface layer:

(a) a diol obtained by a reaction between a polytetramethylene glycol (PTMG) having a number-average molecular weight of 650 or more and 1,000 or less and 4,4'-diphenylmethane diisocyanate, the diol having a weight-average molecular weight of 8,000 or more and 12,000 or less; and (b) an isocyanate compound obtained by a reaction between a polypropylene glycol (PPG) having a number-average molecular weight of 700 or more and 2,000 or less and polymeric diphenylmethane diisocyanate, the isocyanate compound having an isocyanate group at least at any one of its terminals, and the isocyanate compound having an average number of functional groups of 3.0 or more and 3.5 or less and a weight-average molecular weight of 25,000 or more and 60,000 or less.

According to another aspect of the present invention, there is provided a developing roller produced by the method described above.

According to another aspect of the present invention, there is provided a process cartridge according to the present invention comprises the developing roller of the above constitution, wherein the developing roller is formed to be detachable from a main body of an electrophotographic apparatus.

According to another aspect of the present invention, there is provided an electrophotographic image-forming apparatus, comprising: an electrophotographic photosensitive member; and a developing roller placed to be opposite to the electrophotographic photosensitive member, wherein the developing roller comprises the developing roller of the above constitution.

According to a further aspect of the present invention, there is provided a developing roller capable of solving the above problems (1) and (2) at high levels. In addition, according to the present invention, there are provided a process cartridge and an electrophotographic image-forming apparatus each of which is capable of stably providing high-quality electrophotographic images under a variety of environments.

Further features of the present invention will become apparent from the following description of exemplary embodiments with reference to the attached drawings.

DESCRIPTION OF THE EMBODIMENTS

Figure 1:
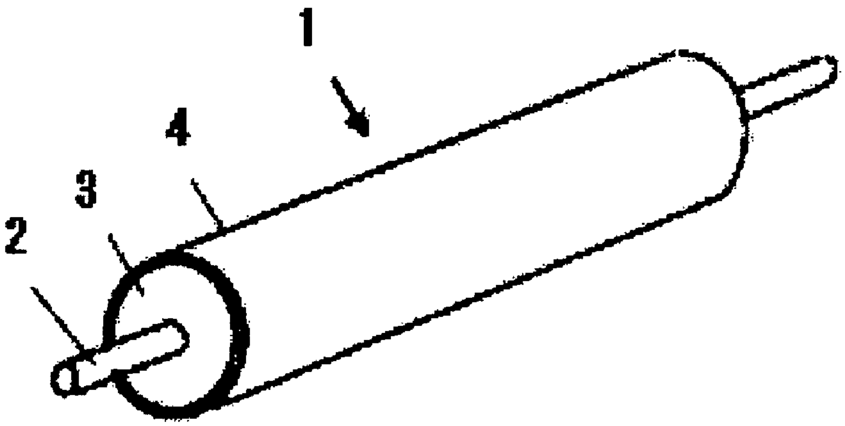
FIG. 1 is a conceptual view illustrating an example of a developing roller of the present invention.

Preferred embodiments of the present invention will now be described in detail in accordance with the accompanying drawings.

The inventors of the present invention have made extensive studies on a polyurethane resin used in the surface layer of a developing roller.

That is, the inventors have conducted investigations on the softening of the polyurethane resin for alleviating "fog." It has been generally said that the "fog" can be alleviated by softening the polyurethane resin. In addition, the following approach has been ordinarily adopted as a method of softening the polyurethane resin: the molecular weight of each of a polyol compound and an isocyanate compound as raw materials for the polyurethane resin is increased so that the crosslink density of the resin may be reduced. However, the investigations conducted by the inventors have found that the "fog" cannot be sufficiently suppressed merely by softening the surface layer with the polyurethane resin which has been softened by such approach. In addition, the inventors have found that the constitution, molecular weight, number of functional groups, and the like of each of the polyol compound and the isocyanate compound as raw materials for the polyurethane resin are germane to the occurrence of the "fog" under a severe environment having a temperature of 10° C. and a humidity of 14% RH.

Specific description is given below.

The surface layer of a developing roller according to the present invention contains a polyurethane resin obtained by causing the following components (a) and (b) to react with each other:

(a) a diol obtained by a reaction between a polytetramethylene glycol (PTMG) having a number-average molecular weight of 650 or more and 1,000 or less and 4,4'-diphenylmethane diisocyanate, the diol having a weight-average molecular weight of 8,000 or more and 12,000 or less; and (b) an isocyanate compound obtained by a reaction between a polypropylene glycol (PPG) having a number-average molecular weight of 700 or more and 2,000 or less and polymeric diphenylmethane diisocyanate, the isocyanate compound having an isocyanate group at least at any one of its terminals, and the isocyanate compound having an average number of functional groups of 3.0 or more and 3.5 or less and a weight-average molecular weight of 25,000 or more and 60,000 or less.

First, the following result was obtained: the use of a polytetramethylene glycol (PTMG) having a molecular weight in a specific range as a raw material for the diol compound (component (a)) as a prepolymer is effective in reducing "fog." In other words, it was difficult to suppress the "fog" when the molecular weight of the PTMG was excessively large or excessively small. Further, the following fact has been found: an alleviating effect on the "fog" is obtained when 4,4'-diphenylmethane diisocyanate (MDI) is used as the isocyanate to be caused to react with the PTMG.

In addition, the following fact has been revealed: it is difficult to control the "fog" when the molecular weight of the diol compound obtained by causing them to react with each other is excessively large or excessively small. When the molecular weight of the PTMG or the diol compound reduces, the polyurethane resin becomes hard, so it is expected to become difficult to suppress duration filming fog. On the other hand, when the molecular weight of the PTMG or the diol compound increases, the polyurethane resin becomes soft, so the increase is expected to be advantageous for the suppression of the "fog."

However, the investigations conducted by the inventors have provided the following result: a preventing effect on the "fog" cannot be obtained when the molecular weight of the PTMG or the diol compound is excessively large. In other words, the inventors have found that an optimum range for the molecular weight of the PTMG or the diol compound exists for suppressing the "fog."

In addition, the inventors have obtained the following completely unexpected result as well: the use of MDI as an isocyanate used upon formation of a prepolymer through the reaction with the PTMG is specifically effective in preventing the "fog." The reason why such result was obtained has not been completely elucidated at present, but the inventors consider the reason as follows: the use of the polyol compound formed of the PTMG and MDI in the formation of the resin of the surface layer contributes to the alleviation of a stress on a developer on a molecular scale.

Next, the inventors have conducted investigations on the isocyanate compound (compound (b)) as a prepolymer. As a result, the inventors have revealed that the isocyanate compound also affects the occurrence of the "fog" to a large extent. The specific isocyanate compound described above as the component (b) was selected on the basis of such finding. To be specific, the use of a polypropylene glycol (PPG) having a molecular weight in a specific range as a raw material for the isocyanate compound was particularly effective in suppressing the "fog." In other words, it was difficult to suppress the "fog" when the molecular weight of the PPG was excessively large or excessively small. Further, the following fact has been revealed: the most significant suppressing effect on the "fog" is obtained when the isocyanate to be caused to react with the PPG is polymeric diphenylmethane diisocyanate (P-MDI). The following fact has been revealed: it is difficult to control the "fog" when the molecular weight of a polyether polyurethane having an isocyanate group at any one of its terminals obtained by causing them to react with each other is excessively large or excessively small. An increase in molecular weight of the polyether polyurethane having an isocyanate group at any one of its terminals is expected to be effective in preventing the "fog" because a polyurethane resin to be obtained becomes soft. However, the investigations conducted by the inventors have revealed the following fact for the first time: when the molecular weight is excessively large, a suppressing effect on the "fog" cannot be obtained, so an optimum range for the molecular weight exists.

Further, the following fact has also been revealed: the adhesion of a developer can be markedly alleviated by using the prepolymer (component (b)) according to the present invention as an isocyanate compound. The incorporation of a polyurethane resin formed of such isocyanate compound into the surface layer was able to achieve compatibility between the suppression of the "fog" and the suppression of the adhesion of the developer which had been difficult to achieve with a conventional technique. Although a detailed mechanism for the foregoing is unclear, the polyurethane resin according to the present invention may control the increase of an intermolecular force acting between the developer and the surface of the developing roller under a high-temperature, high-humidity environment.

Figure 2:
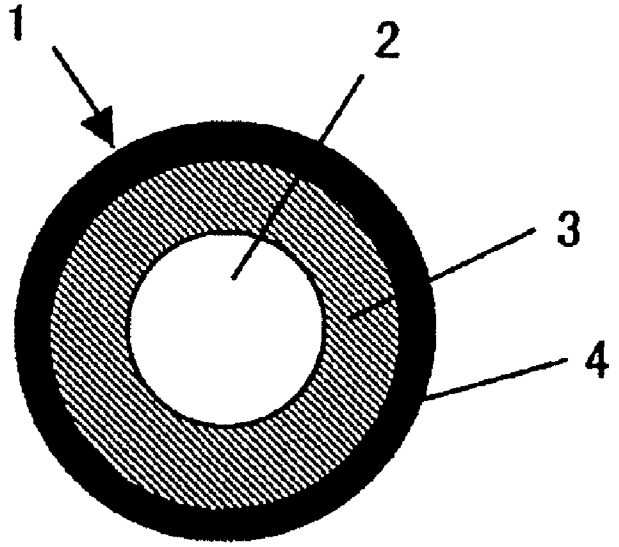
FIG. 2 is a conceptual view illustrating a section of the example of the developing roller of the present invention.

FIG. 1 is a perspective view of the developing roller according to the present invention, and FIG. 2 is a sectional view when the developing roller illustrated in FIG. 1 is cut in the direction perpendicular to its rotation axis. As illustrated in FIGS. 1 and 2, a developing roller 1 has a cylindrical or hollow cylindrical, conductive mandrel 2, a resin layer 3 formed on the outer peripheral surface of the core body, and a surface layer 4 formed on the outer peripheral surface of the resin layer. The surface layer 4 can be produced by a production method including the step of thermally curing a mixture containing at least a carbon black, and compounds having the following characteristics (a) and (b) to form a surface layer:

(a) a diol obtained by a reaction between a polytetramethylene glycol (PTMG) having a number-average molecular weight of 650 or more and 1,000 or less and 4,4'-diphenylmethane diisocyanate, the diol having a weight-average molecular weight of 8,000 or more and 12,000 or less; and (b) an isocyanate compound obtained by a reaction between a polypropylene glycol (PPG) having a number-average molecular weight of 700 or more and 2,000 or less and polymeric diphenylmethane diisocyanate, the isocyanate compound having an isocyanate group at least at any one of its terminals, and the isocyanate compound having an average number of functional groups of 3.0 or more and 3.5 or less and a weight-average molecular weight of 25,000 or more and 60,000 or less.

Hereinafter, the present invention is described in more detail.

<Conductive Mandrel 2>

The conductive mandrel 2 functions as each of an electrode and a supporting member for the developing roller 1. A material for the core body is, for example, a metal or alloy such as aluminum, a copper alloy, or stainless steel, iron plated with chromium, nickel, or the like, or a synthetic resin having conductivity. The mandrel typically has an outer diameter in the range of 4 to 10 mm.

<Resin Layer 3>

A resin base material for the resin layer 3 is specifically, for example, any one of the following materials:

polyurethane, natural rubbers, a butyl rubber, a nitrile rubber, an isoprene rubber, a butadiene rubber, a silicone rubber, a styrene-butadiene rubber, an ethylene-propylene rubber, an ethylene-propylene-diene rubber, a chloroprene rubber, and an acrylic rubber.

One kind of them may be used, or two ore more kinds of them may be used in combination. Of those, a silicone rubber having small compression set is preferred. Examples of the silicone rubber are given below:

polydimethyl siloxane, polymethyl trifluoropropyl siloxane, polymethylvinyl siloxane, polyphenylvinyl siloxane, copolymers of those polysiloxanes, and the like.

In addition, one kind of them may be used, or two or more kinds of them may be used in combination as required.

At least one chosen from an electron conductive substance and an ion conductive substance can be used as a conductive substance used for imparting conductivity to the resin layer 3. Examples of the electron conductive substance include: conductive carbons such as a Ketjen Black EC and acetylene black; rubber carbons such as an SAF, ISAF, HAF, FEF, GPF, SRF, FT, and MT; color ink carbons each subjected to an oxidation treatment; metals such as copper, silver, and germanium; and oxides of the metals. One kind of those conductive substances may be used, or two or more kinds of them may be used in combination. Of those, a carbon black such as a conductive carbon, a rubber carbon, or a color ink carbon is preferable because the conductivity of the layer can be easily controlled with a small amount of the carbon black.

Examples of the ion conductive substance include: inorganic compounds such as sodium perchlorate, lithium perchlorate, calcium perchlorate, and lithium chloride; a modified aliphatic dimethylammonium ethosulfate; and stearylammonium acetate.

Any such conductive substance is used in an amount required for the resin layer 3 to have a desired volume resistivity. The conductive substance is used in an amount in the range of, for example, 0.5 to 50 parts by mass, or preferably 1 to 30 parts by mass with respect to 100 parts by mass of the resin base material. In addition, the resin layer 3 has a volume resistivity of preferably $1\times10^{3}$ Ω·cm or more and $1\times10^{13}$ Ω·cm or less, or more preferably $1\times10^{4}$ Ω·cm or more and $1\times10^{12}$ Ω·cm or less.

A method of producing the resin layer 3 is, for example, as described below. The resin layer 3 is formed on the outer periphery of the conductive mandrel 2 to which an adhesive or the like has been appropriately applied. A method of forming the resin layer 3 is, for example, a production method involving: injecting a composition for molding the resin layer 3 into a cavity of a molding die provided with the conductive mandrel 2; and subjecting the composition to reaction curing or solidification by, for example, heating or irradiation with an active energy ray to integrate the composition with the conductive mandrel 2. Alternatively, the resin layer 3 may be produced on the conductive mandrel 2 by: cutting, by machining or the like, a tubular shape having a predetermined shape and predetermined dimensions out of a slab or block separately molded in advance out of the composition for molding the resin layer 3; and pressing the mandrel 2 into the tubular shape. Further, the outer diameter of the resin layer 3 may be adjusted to a predetermined value by cutting or an abrasion treatment.

<Surface Layer 4>

The surface layer 4 contains a carbon black and a polyether polyurethane resin, and the polyether polyurethane resin is obtained by thermally curing a heat-curable mixture containing the components (a) and (b) listed above.

The diol compound as the component (a) is obtained by extending the chain of a PTMG free of any branched structure and having a number-average molecular weight (Mn) of 650 or more and 1,000 or less with MDI. Hereinafter, the diol may be referred to as "polyether polyurethane polyol."

An ether-based polyurethane, in particular, a polyurethane having the PTMG at its main chain is most suitable for softening a polyurethane resin while maintaining the advantages of the resin, i.e., abrasion resistance and mechanical strength. However, a large amount of an unreacted component may remain when the following procedure is merely adopted: the crosslink density of the resin is reduced, and the molecular weight of a soft segment is increased. When the developing roller is incorporated into a cartridge, and the resultant is left to stand under a high-temperature, high-humidity environment for a long time period, the unreacted component exudes to the surface of the developing roller at a portion where the developing roller and a developing blade are brought into press contact with each other, and the exuding component serves as one cause for the adhesion of the developer. An excellent preventing effect on the adhesion of the developer can be exerted when the chain of the PTMG is extended with MDI.

When the Mn of the PTMG is less than 650, the "fog" may become additionally remarkable in association with an increase in hardness of the polyurethane resin. In addition, when the Mn of the PTMG exceeds 1,000, the remaining amount of the unreacted component increases, so the exudation may promote an increase in extent to which the "fog" is remarkable, and the adhesion of the developer.

The resultant polyether polyurethane polyol must have two functional groups, that is, the polyether polyurethane polyol must be a diol, and the polyether polyurethane polyol must have a weight-average molecular weight (Mw) of 8,000 or more and 12,000 or less. When the number of functional groups exceeds two, the crosslink density of the polyurethane resin increases, so the "fog" becomes additionally remarkable in some cases. In addition, setting the Mw of the polyether polyurethane polyol within the range of 8,000 or more to 12,000 or less suppresses the occurrence of the "fog", whereby a high-quality image can be obtained.

A method of synthesizing the PTMG or the polyether polyurethane polyol described above is not particularly limited, and a known organic synthesis method can be employed. In addition, a known approach such as the control of a reaction time or reaction temperature can be employed for controlling the molecular weight of each of those compounds.

In addition, a polyol compound (component (c)) except the component (a) may be further added to the heat-curable mixture containing the components (a) and (b). Examples of the component (c) include a polyester polyol, a polycarbonate polyol, a polyether polyol, and a polyolefin polyol. Of those, the polyether polyol is particularly preferably used because of its excellent compatibility with the polyol compound (a).

In addition, the content of the polyol compound (a) is preferably set to 76 mass % or more with respect to all polyol compounds. The content of the component (a) is represented by the following equation in terms of the mass of a solid.

$$\text{Content of component }(a)=\{(\text{mass of component }(a))/(\text{mass of component }(a)+\text{mass of component }(c))\}\times100(\%)$$

The component (b) is a polyether polyurethane having an isocyanate group at any one of its terminals obtained by extending the chain of a PPG free of any branched structure and having a number-average molecular weight (Mn) of 700 or more and 2,000 or less with P-MDI.

An isocyanate largely affects compatibility between the control of the "fog" and the suppression of the adhesion of the developer to the surface of a developer carrier. That is, a combination of a PPG having a molecular weight in a specific range and P-MDI allows the surface layer to exert the following specific performance: the surface layer is soft, but the developer does not adhere to the surface layer. When the Mn of the PPG is less than 700, the "fog" may become additionally remarkable in association with an increase in hardness of the polyurethane resin. In addition, when the Mn of the PPG exceeds 2,000, the remaining amount of the unreacted component increases, so the exudation of the component may promote an increase in extent to which duration filming fog is remarkable, and the adhesion of the developer. The resultant component (b) must have an average number of functional groups of 3.0 or more and 3.5 or less, and a weight-average molecular weight (Mw) of 25,000 or more and 60,000 or less. Setting the average number of functional groups within the range of 3.0 or more to 3.5 or less is extremely effective in achieving compatibility between the prevention of the duration filming fog and the prevention of the adhesion of the developer. In addition, setting the Mw within the range of 25,000 or more to 60,000 or less can provide a high-quality image. In addition, the isocyanate group at a terminal of the isocyanate compound (b) is a known organic material, and can be used in the form of a blocked isocyanate as well.

A method of synthesizing the PPG or the isocyanate compound described above is not particularly limited, and a known organic synthesis method can be employed. In addition, a known approach such as the control of a reaction time or reaction temperature can be employed for controlling the molecular weight of each of those compounds.

A ratio of the isocyanate compound (b) in the heat-curable mixture is preferably 32 mass % or more and 42 mass % or less. Here, the content (mass %) of the isocyanate compound (b) as a component ratio in the polyurethane resin is defined as described below in terms of the mass of a solid.

Content (mass %) of isocyanate compound (*b*)={mass of isocyanate compound (*b*)/(mass of polyol compound+mass of isocyanate compound (*b*))}×100(%)

Here, the mass of the polyol compound refers to the mass of the diol compound (a) when the diol compound (a) is used alone; in addition, the mass refers to the total mass [(a)+(c)] of the diol compound (a) and the other polyol compound (c) when the diol compound (a) and the other polyol compound (c) are used in combination.

The surface layer 4 must contain the carbon black. The carbon black imparts conductivity to, and improves the abrasion resistance of, the surface layer 4, and at the same time, inhibits the occurrence of the adhesion of the developer caused by a state where the surface layer is left to stand for a long time period under a high-temperature, high-humidity environment. Examples of the carbon black added to the surface layer 4 include: conductive carbons such as a Ketjen Black EC and acetylene black; rubber carbons such as an SAF, ISAF, HAF, FEF, GPF, SRF, FT, and MT; and color ink carbons each subjected to an oxidation treatment.

In addition, two or more kinds of the above carbon blacks may be used in combination as required.

The content of the carbon black in the surface layer 4 is preferably 3 parts by mass or more and 50 parts by mass or less, or particularly preferably 10 parts by mass or more and 30 parts by mass or less with respect to 100 parts by mass of the polyether polyurethane resin. The volume resistivity of the developing roller is adjusted to preferably $1\times10^3$ Ω·cm or more and $1\times10^{13}$ Ω·cm or less, or more preferably $1\times10^4$ Ω·cm or more and $1\times10^{12}$ Ω·cm or less by adding such carbon black.

Roughening particles may be added to the surface layer 4 as required in order that the developer may be stably conveyed. Particles each formed of any one of the following materials can be suitably used as the roughening particles:

rubber particles such as EPDM, NBR, SBR, CR, and silicone rubber; elastomer particles such as polystyrene, polyolefin, polyvinyl chloride, polyurethane, polyester, and polyamide-based thermoplastic elastomer (TPE); and resin particles such as PMMA, a urethane resin, a fluorine resin, a silicone resin, a phenol resin, a naphthalene resin, a furan resin, a xylene resin, a divinylbenzene polymer, a styrene-divinylbenzene copolymer, and a polyacrylonitrile resin. These kinds of particles may be used independently or in combination of two or more kinds thereof.

In addition, those particles have an average particle diameter of preferably 1 μm or more and 30 μm or less, or more preferably 3 μm or more and 20 μm or less. The average particle diameter of those particles is an average derived from the particle diameters of 100 arbitrarily sampled particles measured with an optical microscope. In addition, when some of the particles are not of true spherical shapes, and hence their particle diameters cannot be uniquely specified, the longest diameter and shortest diameter of each of the particles are measured, and the simple average of the diameters is used in the calculation of the average particle diameter.

The surface roughness of the developing roller is suitably adjusted so that its Rz based on JIS B0601:2001 may be 2 μm or more and 25 μm or less, or more preferably 5 μm or more and 15 μm or less. It should be noted that the Rz of the developing roller in the present invention can be measured with a contact type surface roughness meter Surfcorder SE3500 (manufactured by Kosaka Laboratory Ltd.). The measurement is performed under the following conditions: a cut-off value of 0.8 mm, a measurement length of 2.5 mm, a feeding speed of 0.1 mm/sec, and a magnification of 5,000. Surface roughnesses Rz are measured at nine arbitrary positions per developing roller, and the arithmetic average of the resultant measured values is defined as the Rz of the developing roller.

The present invention relates to a production method including the step of thermally curing a mixture containing at least the carbon black, the polyol compound (a), and the isocyanate compound (b) to form the surface layer 4. A method of producing the surface layer 4 is described in more detail. The polyol compound (a), the isocyanate compound (b), and the carbon black are stirred and kneaded in advance with, for example, a ball mill so that a composition for molding a surface layer may be obtained. A coating film is formed of the resultant composition for molding a surface layer on the surface of the above resin layer 3 by coating such as spraying, dipping, or roll coating, and is then thermally cured. In this case, the thermal curing is preferably performed at 130° C. or higher and 160° C. or lower for a time period of 1 hour or more and 4 hours or less in order that a reaction between the polyol compound (a) and the isocyanate compound (b) may be completed.

<Molecular Weight Measurement>

An apparatus and conditions adopted for the measurement of a number-average molecular weight (Mn) and a weight-average molecular weight (Mw) are as described below.

| | |
|---|---|
| Measuring device: | An HLC-8120GPC (manufactured by TOSOH CORPORATION) |
| Column: | Two TSKgel SuperHM-M's (manufactured by TOSOH CORPORATION) |
| Solvent: | THF |
| Temperature: | 40° C. |
| Flow rate of THF: | 0.6 ml/min |

It should be noted that a 0.1-mass % THF solution was used as a measurement sample. Further, a refractive index (RI) detector was used as a detector. The following standard samples were each used for the creation of a calibration curve: TSK standard polystyrenes A-1000, A-2500, A-5000, F-1, F-2, F-4, F-10, F-20, F-40, F-80, and F-128 (manufactured by TOSOH CORPORATION).

In addition, each molecular weight was determined from the retention time of the measurement sample obtained on the basis of the foregoing. (Process cartridge and electrophotographic image-forming apparatus)

A process cartridge according to the present invention is a process cartridge including the developing roller of the above constitution, the process cartridge being characterized in that the developing roller is formed so as to be detachable from the main body of an electrophotographic apparatus. In addition, an electrophotographic image-forming apparatus according to the present invention is an electrophotographic image-forming apparatus including an electrophotographic photosensitive member and a developing roller placed so as to be opposite to the electrophotographic photosensitive member, the electrophotographic image-forming apparatus being characterized in that the developing roller is the developing roller of the above constitution.

The electrophotographic image-forming apparatus is, for example, an electrophotographic image-forming apparatus including at least the following member and units:

an image-bearing member for bearing an electrostatic latent image;

a charging unit for subjecting the image-bearing member to primary charging;

an exposing unit for forming an electrostatic latent image on the image-bearing member subjected to the primary charging;

a developing unit for developing the electrostatic latent image with a developer to form a developer image; and a transfer unit for transferring the developer image onto a transfer material.

Figure 3:
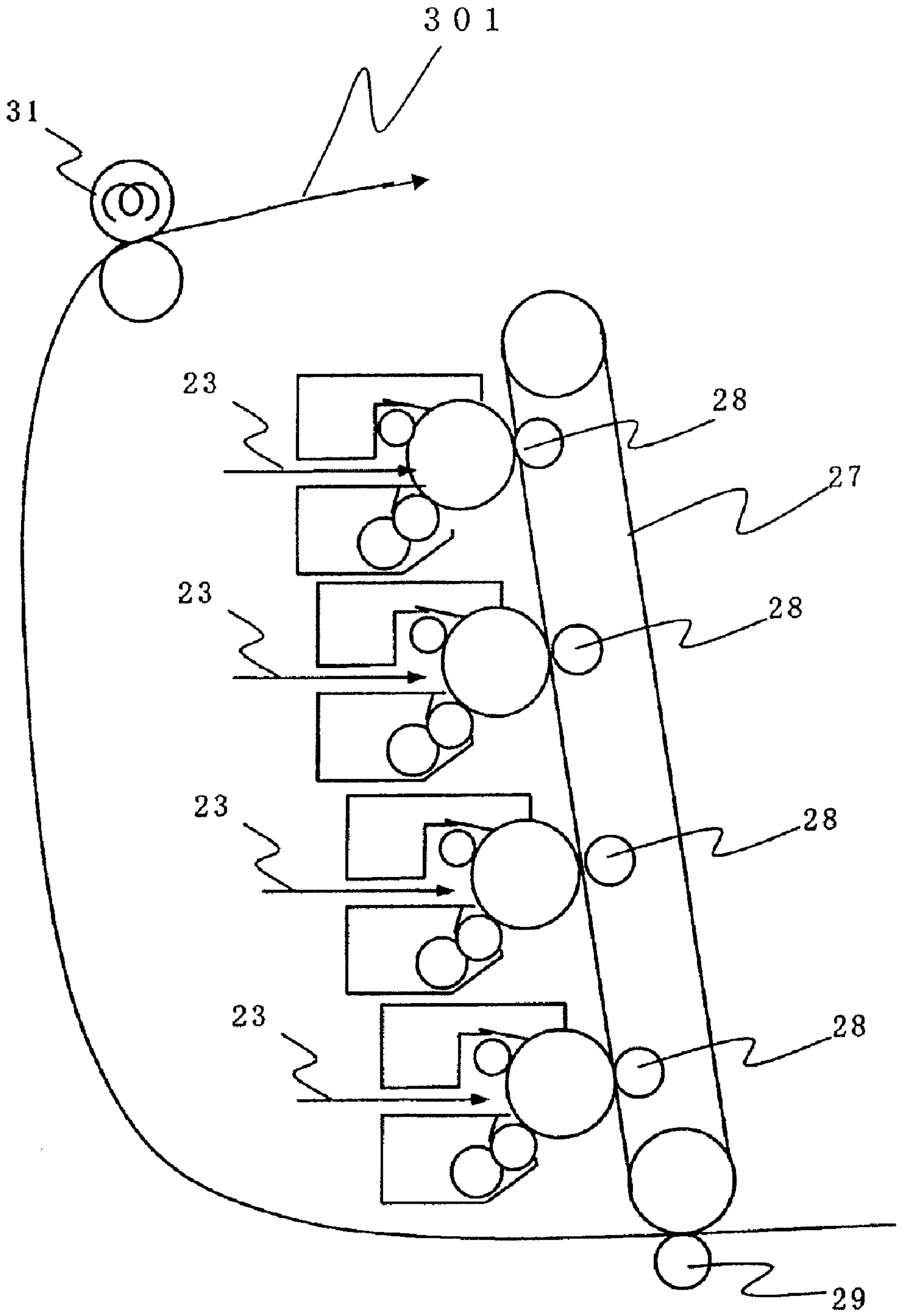
FIG. 3 is a schematic constitution view illustrating an example of an image-forming apparatus of the present invention.

FIG. 3 is a sectional view illustrating the outline of the electrophotographic image-forming apparatus of the present invention.

Figure 4:
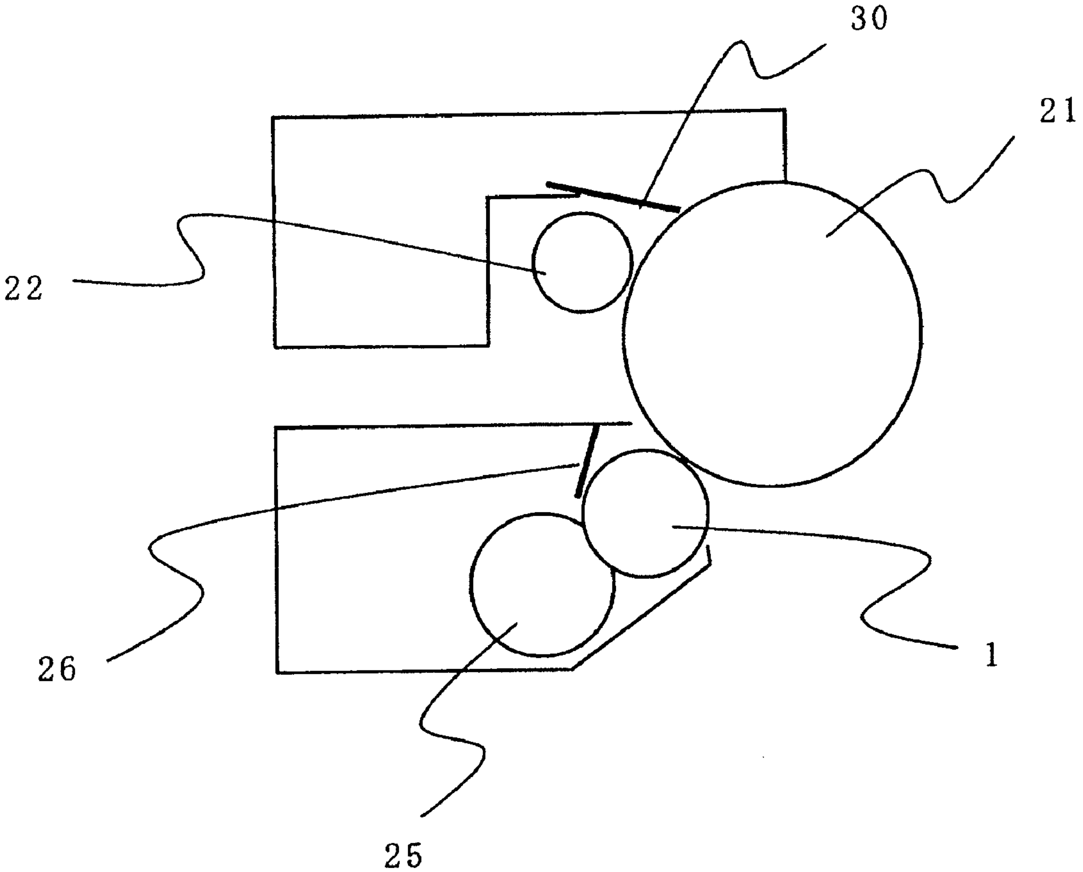
FIG. 4 is a schematic constitution view illustrating an example of a process cartridge of the present invention.

FIG. 4 is an enlarged sectional view of a process cartridge mounted on the image-forming apparatus of FIG. 3. A photosensitive drum 21 as an image-bearing member is uniformly charged by a charging member 22 connected to a bias power supply (not shown). The charged potential in this case is about −400 V to −800 V. Next, an electrostatic latent image is formed on the surface of the photosensitive drum 21 by an exposing unit 23 for writing the electrostatic latent image. Each of LED light and laser light can be used in the exposing unit 23. The exposed portion of the photosensitive drum 21 has a surface potential of about −100 V to −200 V. Next, the electrostatic latent image is provided (developed) with a negatively charged developer by the developing roller 1 built in the process cartridge detachable from the main body of the image-forming apparatus, whereby the electrostatic latent image is transformed into a visible image. In this case, a voltage of about −300 V to −500 V is applied from the bias power supply (not shown) to the developing roller 1.

Next, the developer image developed on the photosensitive drum 21 is primarily transferred onto an intermediate transfer belt 27. A primary transfer member abuts the rear surface of the intermediate transfer belt 27, and the application of a voltage of about +100 V to +1,500 V to the primary transfer member 28 results in the primary transfer of the negatively charged developer image from the photosensitive drum 21 onto the intermediate transfer belt 27. The primary transfer member 28 may be of a roller shape, or may be of a blade shape.

When an image-forming apparatus is the full-color image-forming apparatus as illustrated in FIG. 3, the charging step, exposing step, developing step, and primary transfer step described above are performed on each of, for example, a yellow color, a cyan color, a magenta color, and a black color. To this end, a total of four process cartridges each including a developer of any one of the colors are detachably mounted on the main body of the image-forming apparatus illustrated in FIG. 3.

It should be noted that the developing roller 1 contacts the photosensitive drum 21 with a nip width of about 0.5 mm to 3 mm. In a developing unit, a developer supplying roller 25 abuts the upstream side of the direction in which the developing roller 1 rotates when viewed from the abutting portion of a developing blade 26 as a developer-regulating member and the developing roller 1, and the roller 25 is rotatively provided.

The charging step, exposing step, developing step, and primary transfer step described above are sequentially performed with predetermined time differences among them, whereby the following state is established: four developer images for representing a full-color image are superimposed on the intermediate transfer belt 27.

The developer images on the intermediate transfer belt 27 are conveyed to a position opposite to a secondary transfer member 29 in association with the rotation of the intermediate transfer belt. In this case, recording paper 32 is conveyed between the intermediate transfer belt 27 and the secondary transfer member 29 at a predetermined timing, and the application of a secondary transfer bias to the secondary transfer member results in the transfer of the developer images on the intermediate transfer belt 27 onto the recording paper 32. In this case, the bias voltage applied to the secondary transfer member 29 is about +1,000 V to +4,000 V. The recording paper 32 onto which the developer images have been transferred by the secondary transfer member 29 is conveyed to a fixing member 31 along a conveying route indicated by an arrow 301 in FIG. 3, and the developer images on the recording paper 32 are melted so as to be fixed on the recording paper 32. After that, the recording paper 32 is discharged to the outside of the image-forming apparatus, whereby a printing operation is terminated.

It should be noted that a developer image remaining on the photosensitive drum 21 without being transferred from the photosensitive drum 21 to the intermediate transfer belt 27 is scraped by a cleaning member 30 for cleaning the surface of the photosensitive drum, whereby the surface of the photosensitive drum 21 is cleaned.

EXAMPLES

Hereinafter, specific examples and comparative examples according to the present invention are described.

A polyether polyurethane polyol as the polyol compound (a) as a material for a surface layer in each example was synthesized as described below.

It should be noted that the hydroxyl value of the polyol compound in the present invention was measured in conformity with Japanese Industrial Standard (JIS) K 1557-1:2007 (ISO 14900:2001).

In addition, an NCO % per solid of an isocyanate in the present invention was measured as follows: upon synthesis of the isocyanate, the isocyanate was sampled prior to a reaction with a blocking agent, and was then subjected to the measurement. The NCO % was determined as described below. The sample was dissolved in toluene, and a 0.5-mol/l solution of dibutyl amine in monochlorobenzene was added to the solution. The mixture was subjected to a heating reaction under a reflux condition for 30 minutes, and was cooled to room temperature. After that, methanol was added as a co-solvent to the mixture, and an excess amine was subjected to back titration with a 0.5-mol/l hydrochloric acid. The determined value was converted in terms of a solid. An average measured for n=3 was used as a numerical value.

<Polyether Polyurethane Polyol A>

The following materials were mixed in stages into 87.8 parts by mass of methyl ethyl ketone (MEK), and the mixture was subjected to a reaction under a nitrogen atmosphere at 80° C. for 4.0 hours, whereby a solution of Polyether Polyurethane Polyol A having a weight-average molecular weight Mw of 8,000, a hydroxyl value of 24 (mgKOH/g), and a number of functional groups of 2.0 in MEK was obtained.

| | |
|---|---|
| Polytetramethylene glycol (trade name: PolyTHF650; manufactured by BASF) | 100.0 parts by mass |
| 4,4'-diphenylmethane diisocyanate (trade name: Cosmonate PH; manufactured by Mitsui Chemicals Polyurethanes, Inc.) | 31.7 parts by mass |

<Polyether Polyurethane Polyol B>

A solution of Polyether Polyurethane Polyol B having a weight-average molecular weight Mw of 10,000, a hydroxyl value of 22 (mgKOH/g), and a number of functional groups of 2.0 in MEK was obtained in the same manner as in Polyether Polyurethane Polyol A except that the reaction time was changed to 4.5 hours.

<Polyether Polyurethane Polyol C>

The following materials were mixed in stages into 79.6 parts by mass of methyl ethyl ketone (MEK), and the mixture was subjected to a reaction under a nitrogen atmosphere at 80° C. for 4.5 hours, whereby a solution of Polyether Polyurethane Polyol C having a weight-average molecular weight Mw of 10,000, a hydroxyl value of 22 (mgKOH/g), and a number of functional groups of 2.0 in MEK was obtained.

| | |
|---|---|
| Polytetramethylene glycol (trade name: PTG1000SN; manufactured by Hodogaya Chemical Co., Ltd.) | 100.0 parts by mass |
| 4,4'-diphenylmethane diisocyanate (trade name: CosmonatePH; manufactured by Mitsui Chemicals Polyurethanes, Inc.) | 19.4 parts by mass |

<Polyether Polyurethane Polyol D>

A solution of Polyether Polyurethane Polyol D having a weight-average molecular weight Mw of 12,000, a hydroxyl value of 20 (mgKOH/g), and a number of functional groups of 2.0 in MEK was obtained in the same manner as in Polyether Polyurethane Polyol C except that the reaction time was changed to 5.5 hours.

<Synthesis of Polyether Polyurethane Polyol Z>

A solution of Polyether Polyurethane Polyol Z having a weight-average molecular weight Mw of 23,000, a hydroxyl value of 12 (mgKOH/g), and a number of functional groups of 2.0 in MEK was obtained in the same manner as in Polyether Polyurethane Polyol A except that the reaction time was changed to 8.0 hours.

Next, a polyether polyurethane having an isocyanate group at any one of its terminals as the isocyanate compound (b) as a material for the surface layer in each example was synthesized as described below.

<Polyether Polyurethane L Having Isocyanate Group at Any One of its Terminals>

The following materials were subjected to a heating reaction under a nitrogen atmosphere at 80° C. for 2 hours. After that, 72.7 parts by mass of butyl cellosolve were added to the reaction product.

| | |
|---|---|
| Polypropylene glycol (trade name: EXCENOL 720; manufactured by ASAHI GLASS CO., LTD.) | 100.0 parts by mass |
| Polymeric diphenylmethane diisocyanate (trade name: MILLIONATE MR-200; manufactured by Nippon Polyurethane Industry Co., Ltd.) | 69.6 parts by mass |

After that, 25.8 parts by mass of MEK oxime were dropped to the mixture under the following condition: the temperature of the reaction product was 50° C. Thus, a solution of Isocyanate Compound L having a weight-average molecular weight Mw of 25,000 and an average number of functional groups of 3.5 in butyl cellosolve was obtained.

<Polyether Polyurethane M Having Isocyanate Group at Any One of its Terminals>

A solution of Isocyanate Compound M having a weight-average molecular weight Mw of 60,000 and an average number of functional groups of 3.4 in butyl cellosolve was obtained in the same manner as in Isocyanate Compound L except that the reaction time was changed to 4.0 hours.

<Polyether Polyurethane N Having Isocyanate Group at Any One of its Terminals>

The following materials were subjected to a heating reaction under a nitrogen atmosphere at 80° C. for 2.5 hours. After that, 63.7 parts by mass of butyl cellosolve were added to the reaction product.

| | |
|---|---|
| Polypropylene glycol (trade name: Sunnix PP-1000; manufactured by Sanyo Chemical Industries, Ltd.) | 100.0 parts by mass |
| Polymeric diphenylmethane diisocyanate (trade name: MILLIONATE MR-200; manufactured by Nippon Polyurethane Industry Co., Ltd.) | 48.7 parts by mass |

After that, 21.2 parts by mass of MEK oxime were dropped to the mixture under the following condition: the temperature of the reaction product was 50° C. Thus, a solution of Isocyanate Compound N having a weight-average molecular weight Mw of 40,000 and an average number of functional groups of 3.2 in butyl cellosolve was obtained.

<Polyether Polyurethane O Having Isocyanate Group at Any One of its Terminals>

The following materials were subjected to a heating reaction under a nitrogen atmosphere at 80° C. for 2.0 hours. After that, 53.3 parts by mass of butyl cellosolve were added to the reaction product.

| | |
|---|---|
| Polypropylene glycol (trade name: Sunnix PP-2000; manufactured by Sanyo Chemical Industries, Ltd.) | 100.0 parts by mass |
| Polymeric diphenylmethane diisocyanate (trade name: MILLIONATE MR-200; manufactured by Nippon Polyurethane Industry Co., Ltd.) | 24.3 parts by mass |

After that, 16.2 parts by mass of MEK oxime were dropped to the mixture under the following condition: the temperature of the reaction product was 50° C. Thus, a solution of Isocyanate Compound O having a weight-average molecular weight Mw of 25,000 and an average number of functional groups of 3.1 in butyl cellosolve was obtained.

<Polyether Polyurethane P Having Isocyanate Group at Any One of its Terminals>

A solution of Isocyanate Compound P having a weight-average molecular weight Mw of 60,000 and an average number of functional groups of 3.0 in butyl cellosolve was obtained in the same manner as in Isocyanate Compound O except that the reaction time was changed to 4.0 hours.

Tables 1-1 and 1-2 below show the characteristics of Polyether Polyurethane Polyols A to D and Z, and Polyether Polyurethanes L to P each having an isocyanate group at any one of its terminals obtained in the foregoing.

TABLE 1-1

| | | No. | | | | |
|---|---|---|---|---|---|---|
| | | A | B | C | D | Z |
| Diol compound (a) | Number-average molecular weight (Mn) of PTMG | 650 | 650 | 1,000 | 1,000 | 650 |
| | Chain-extending isocyanate | MDI | MDI | MDI | MDI | MDI |
| | Weight-average molecular weight (Mw) of diol compound (a) | 8,000 | 10,000 | 10,000 | 12,000 | 23,000 |
| | Number of functional groups of diol compound (a) | 2 | 2 | 2 | 2 | 2 |

TABLE 1-2

| | | No. | | | | |
|---|---|---|---|---|---|---|
| | | L | M | N | O | P |
| Isocyanate compound (b) | Number-average molecular weight (Mn) of PPG | 700 | 700 | 1,000 | 2,000 | 2,000 |
| | Chain-extending isocyanate | P-MDI | P-MDI | P-MDI | P-MDI | P-MDI |
| | Weight-average molecular weight (Mw) of isocyanate compound (b) | 25,000 | 60,000 | 40,000 | 25,000 | 60,000 |
| | Average number of functional groups of isocyanate compound (b) | 3.5 | 3.4 | 3.2 | 3.1 | 3.0 |

Example 1

Preparation of Conductive Mandrel 2

The conductive mandrel 2 was prepared by: applying a primer (trade name: DY35-051; manufactured by Dow Corning Toray Silicone Co., Ltd.) to a core metal having a diameter of 6 mm made of SUS304; and baking the applied primer at a temperature of 150° C. for 30 minutes.

<Preparation of Resin Layer 3>

Next, the conductive mandrel 2 was placed in a die, and a liquid, conductive, silicone rubber (product manufactured by Dow Corning Toray Silicone Co., Ltd. and having an ASKER-C hardness of 40 degrees and a volume resistivity of $1\times10^5$ Ω·cm) was injected into a cavity formed in the die. Subsequently, the die was heated, and the silicone rubber was vulcanized at 150° C. for 15 minutes. The resultant was removed from the die, and was then heated at 200° C. for 2 hours so that a curing reaction might be completed. Thus, the resin layer 3 having a diameter of 12 mm was provided on the outer periphery of the conductive mandrel 2.

<Preparation of Surface Layer 4>

The following materials were mixed and stirred with a stirring motor. The mixture was dissolved in MEK so that the total solid content might be 30 mass %, and then the contents were mixed. After that, the resultant was subjected to uniform dispersion with a sand mill, whereby a paint 1 for forming a surface layer was obtained.

| | |
|---|---|
| Diol Compound A: | 62 parts by mass (as a solid) |
| Isocyanate Compound P: | 38 parts by mass (as a solid) |
| Carbon black (trade name: MA100; manufactured by Mitsubishi Chemical Corporation): | 25 parts by mass |
| Resin particles (trade name: ART PEARL C600 transparent; manufactured by Negami Chemical Industrial Co., Ltd.): | 30 parts by mass |

Next, the resin layer 3 was coated with the paint by dip coating. Then, the paint was dried, and was cured under heat at a temperature of 140° C. for 2 hours so that a surface layer having a thickness of 15 μm might be provided on the outer periphery of the resin layer 3. Thus, a developing roller of Example 1 was obtained.

Examples 2 to 32

Developing rollers were each prepared in the same manner as in Example 1 except that the formulation of the paint for forming a surface layer in Example 1 was changed as shown in Tables 2 and 3 below.

Example 33

A developing roller was prepared in the same manner as in Example 1 except that the formulation of the paint for forming a surface layer in Example 1 was changed as shown below. The following materials were mixed and stirred with a stirring motor. The mixture was dissolved in MEK so that the total solid content might be 30 mass %, and then the contents were mixed. After that, the resultant was subjected to uniform dispersion with a sand mill, whereby the paint 1 for forming a surface layer was obtained.

| | |
|---|---|
| Diol Compound A: | 56 parts by mass (as a solid) |
| Diol Compound Z: | 6 parts by mass (as a solid) |
| Isocyanate Compound P: | 38 parts by mass (as a solid) |
| Carbon black (trade name: MA100; manufactured by Mitsubishi Chemical Corporation): | 25 parts by mass |
| Resin particles (trade name: ART PEARL C600 transparent; manufactured by Negami Chemical Industrial Co., Ltd.): | 30 parts by mass |

Example 34

A developing roller was prepared in the same manner as in Example 1 except that the formulation of the paint for forming a surface layer in Example 1 was changed as shown below. That is, the following materials were mixed and stirred with a stirring motor. The mixture was dissolved in MEK so that the total solid content might be 30 mass %, and then the contents were mixed. After that, the resultant was subjected to uniform dispersion with a sand mill, whereby the paint 1 for forming a surface layer was obtained.

| | |
|---|---|
| Diol Compound A: | 47 parts by mass (as a solid) |
| Diol Compound Z: | 15 parts by mass (as a solid) |
| Isocyanate Compound P: | 38 parts by mass (as a solid) |
| Carbon black (trade name: MA100; manufactured by Mitsubishi Chemical Corporation): | 25 parts by mass |
| Resin particles (trade name: ART PEARL C600 transparent; manufactured by Negami Chemical Industrial Co., Ltd.): | 30 parts by mass |

TABLE 2

| | Diol compound (a) | | Isocyanate compound (b) | | Carbon Black | |
|---|---|---|---|---|---|---|
| | No. | Parts by mass | No. | Parts by mass | No. | Parts by mass |
| Example 1 | A | 62 | P | 38 | *1 | 25 |
| Example 2 | C | 62 | P | 38 | *1 | 25 |
| Example 3 | D | 62 | P | 38 | *1 | 25 |
| Example 4 | C | 66 | M | 34 | *1 | 25 |
| Example 5 | A | 66 | N | 34 | *1 | 25 |
| Example 6 | B | 66 | N | 34 | *1 | 25 |
| Example 7 | C | 60 | N | 40 | *1 | 25 |
| Example 8 | D | 60 | N | 40 | *1 | 25 |
| Example 9 | C | 60 | O | 40 | *1 | 25 |
| Example 10 | A | 62 | L | 38 | *1 | 25 |
| Example 11 | C | 62 | L | 38 | *1 | 25 |
| Example 12 | D | 62 | L | 38 | *1 | 25 |

TABLE 3

| | Diol compound (a) | | Isocyanate compound (b) | | Carbon Black | |
|---|---|---|---|---|---|---|
| | No. | Parts by mass | No. | Parts by mass | No. | Parts by mass |
| Example 13 | A | 68 | P | 32 | *2 | 20 |
| Example 14 | D | 68 | P | 32 | *2 | 20 |
| Example 15 | C | 68 | N | 32 | *2 | 20 |

TABLE 3-continued

| | Diol compound (a) | | Isocyanate compound (b) | | Carbon Black | |
|---|---|---|---|---|---|---|
| | No. | Parts by mass | No. | Parts by mass | No. | Parts by mass |
| Example 16 | A | 68 | L | 32 | *3 | 15 |
| Example 17 | D | 68 | L | 32 | *3 | 15 |
| Example 18 | A | 58 | P | 42 | *3 | 15 |
| Example 19 | D | 58 | P | 42 | *4 | 23 |
| Example 20 | C | 58 | N | 42 | *4 | 23 |
| Example 21 | A | 58 | L | 42 | *4 | 23 |
| Example 22 | D | 58 | L | 42 | *5 | 25 |
| Example 23 | A | 70 | P | 30 | *5 | 25 |
| Example 24 | D | 70 | P | 30 | *5 | 25 |
| Example 25 | C | 70 | N | 30 | *6 | 30 |
| Example 26 | A | 70 | L | 30 | *6 | 30 |
| Example 27 | D | 70 | L | 30 | *6 | 30 |
| Example 28 | A | 55 | P | 45 | *1 | 30 |
| Example 29 | D | 55 | P | 45 | *1 | 30 |
| Example 30 | C | 55 | N | 45 | *1 | 25 |
| Example 31 | A | 55 | L | 45 | *1 | 25 |
| Example 32 | D | 55 | L | 45 | *1 | 25 |
| Example 33 | A/Z | 56/5 | P | 38 | *1 | 25 |
| Example 34 | A/Z | 47/15 | P | 38 | *1 | 25 |

Note that, in Tables 2 and 3, the symbols in the item of carbon black each represent the following.

*1: Carbon black (trade name: MA100, manufactured by Mitsubishi Chemical Corporation)

*2: Carbon black (trade name: ColorBlack S-160, manufactured by Degussa Japan Co., Ltd.)

*3: Carbon black (trade name: ColorBlack S-170, manufactured by Degussa Japan Co., Ltd.)

*4: Carbon black (trade name: Printex V, manufactured by Degussa Japan Co., Ltd.)

*5: Carbon black (trade name: SpecialBlack 4, manufactured by Degussa Japan Co., Ltd.)

*6: Carbon black (trade name: SUNBLACK X15, manufactured by Asahi Carbon Co., Ltd.)

Next, a polyether polyurethane polyol as the polyol compound (a) as a material for a surface layer in each comparative example was synthesized as described below.

<Synthesis of Polyether Polyurethane Polyol E>

The following materials were mixed in stages into 112.9 parts by mass of methyl ethyl ketone (MEK), and the mixture was subjected to a reaction under a nitrogen atmosphere at 80° C. for 4.0 hours, whereby a solution of Polyether Polyurethane Polyol E having a weight-average molecular weight Mw of 8,000, a hydroxyl value of 24 (mgKOH/g), and a number of functional groups of 2.0 in MEK was obtained.

| | |
|---|---|
| Polytetramethylene glycol (trade name: PolyTHF250; manufactured by BASF) | 100.0 parts by mass |
| 4,4'-diphenylmethane diisocyanate (trade name: Cosmonate PH; manufactured by Mitsui Chemicals Polyurethanes, Inc.) | 69.4 parts by mass |

<Synthesis of Polyether Polyurethane Polyol F>

A solution of Polyether Polyurethane Polyol F having a weight-average molecular weight Mw of 6,000, a hydroxyl value of 27 (mgKOH/g), and a number of functional groups of 2.0 in MEK was obtained in the same manner as in Polyether Polyurethane Polyol C except that the reaction time was changed to 3.0 hours.

<Synthesis of Polyether Polyurethane Polyol G>

A solution of Polyether Polyurethane Polyol G having a weight-average molecular weight Mw of 15,000, a hydroxyl value of 16 (mgKOH/g), and a number of functional groups of 2.0 in MEK was obtained in the same manner as in Polyether Polyurethane Polyol C except that the reaction time was changed to 6.0 hours.

<Synthesis of Polyether Polyurethane Polyol H>

The following materials were mixed in stages into 74.1 parts by mass of methyl ethyl ketone (MEK), and the mixture was subjected to a reaction under a nitrogen atmosphere at 80° C. for 5.5 hours, whereby a solution of Polyether Polyurethane Polyol H having a weight-average molecular weight Mw of 12,000, a hydroxyl value of 15 (mgKOH/g), and a number of functional groups of 2.0 in MEK was obtained.

| | |
|---|---|
| Polytetramethylene glycol (trade name: PTG2000; manufactured by Hodogaya Chemical Co., Ltd.) | 100.0 parts by mass |
| 4,4'-diphenylmethane diisocyanate (trade name: Cosmonate PH; manufactured by Mitsui Chemicals Polyurethanes, Inc.) | 11.1 parts by mass |

<Synthesis of Polyether Polyurethane Polyol I>

The following materials were mixed in stages into 116.9 parts by mass of methyl ethyl ketone (MEK), and the mixture was subjected to a reaction under a nitrogen atmosphere at 80° C. for 4.5 hours, whereby a solution of Polyether Polyurethane Polyol I having a weight-average molecular weight Mw of 10,000, a hydroxyl value of 22 (mgKOH/g), and a number of functional groups of 2.0 in MEK was obtained.

| | |
|---|---|
| Polytetramethylene glycol (trade name: PTG1000SN; manufactured by Hodogaya Chemical Co., Ltd.) | 100.0 parts by mass |
| Isophorone diisocyanate (trade name: Takenate 500; manufactured by Mitsui Chemicals Polyurethanes, Inc.) | 16.9 parts by mass |
| 500 (trade name, manufactured by Mitsui Chemicals Polyurethanes, Inc.) | 16.9 parts by mass |

<Synthesis of Polyether Polyurethane Polyol J>

The following materials were mixed in stages into 87.8 parts by mass of methyl ethyl ketone (MEK), and the mixture was subjected to a reaction under a nitrogen atmosphere at 80° C. for 4.5 hours, whereby a solution of Polyether Polyurethane Polyol J having a weight-average molecular weight Mw of 8,000, a hydroxyl value of 24 (mgKOH/g), and a number of functional groups of 2.0 in MEK was obtained.

| | |
|---|---|
| Polypropylene glycol (trade name: Exenol 720; manufactured by ASAHI GLASS CO., LTD.) | 100.0 parts by mass |
| 4,4'-diphenylmethane diisocyanate (trade name: Cosmonate PH; manufactured by Mitsui Chemicals Polyurethanes, Inc.) | 31.7 parts by mass |

<Synthesis of Polyether Polyurethane Polyol K>

The following materials were mixed in stages into 168.5 parts by mass of methyl ethyl ketone (MEK), and the mixture was subjected to a reaction under a nitrogen atmosphere at 80° C. for 4.5 hours, whereby a solution of Polyether Polyurethane Polyol K having a weight-average molecular weight Mw of 10,000, a hydroxyl value of 40 (mgKOH/g), and an average number of functional groups of 2.3 in MEK was obtained.

| | |
|---|---|
| Polytetramethylene glycol (trade name: PTG1000SN; manufactured by Hodogaya Chemical Co., Ltd.) | 100.0 parts by mass |
| 4,4'-diphenylmethane diisocyanate (trade name: Cosmonate PH; manufactured by Mitsui Chemicals Polyurethanes, Inc.) | 58.5 parts by mass |
| Glycerin | 10.0 parts by mass |

Next, a polyether polyurethane having an isocyanate group at any one of its terminals as the isocyanate compound (b) as a material for the surface layer in each comparative example was synthesized as described below.

<Synthesis of Polyether Polyurethane Q Having Isocyanate Group at any One of its Terminals>

A solution of Isocyanate Compound Q having a weight-average molecular weight Mw of 23,000 and an average number of functional groups of 3.5 in butyl cellosolve was obtained in the same manner as in Isocyanate Compound L except that the reaction time was changed to 1.75 hours.

<Synthesis of Polyether Polyurethane R Having Isocyanate Group at any One of its Terminals>

A solution of Isocyanate Compound R having a weight-average molecular weight Mw of 63,000 and an average number of functional groups of 3.0 in butyl cellosolve was obtained in the same manner as in Isocyanate Compound O except that the reaction time was changed to 4.25 hours.

<Synthesis of Polyether Polyurethane S Having Isocyanate Group at any One of its Terminals>

The following materials were subjected to a heating reaction under a nitrogen atmosphere at 80° C. for 2 hours. After that, 72.7 parts by mass of butyl cellosolve were added to the reaction product.

| | |
|---|---|
| Polypropylene glycol (trade name: EXCENOL 720; manufactured by ASAHI GLASS CO., LTD.): | 100.0 parts by mass |
| Polymeric diphenylmethane diisocyanate (trade name: MILLIONATE MR-200; manufactured by Nippon Polyurethane Industry Co., Ltd.): | 75 parts by mass |

After that, 29.8 parts by mass of MEK oxime were dropped to the mixture under the following condition: the temperature of the reaction product was 50° C. Thus, a solution of Isocyanate Compound S having a weight-average molecular weight Mw of 26,000 and an average number of functional groups of 3.7 in butyl cellosolve was obtained.

<Synthesis of Polyether Polyurethane T Having Isocyanate Group at any One of its Terminals>

The following materials were subjected to a heating reaction under a nitrogen atmosphere at 80° C. for 4.0 hours. After that, 53.3 parts by mass of butyl cellosolve were added to the reaction product.

| | |
|---|---|
| Polypropylene glycol (trade name: Sannix PP-2000; manufactured by Sanyo Chemical Industries, Ltd.): | 100.0 parts by mass |
| Polymeric diphenylmethane diisocyanate (trade name: MILLIONATE MR-200; manufactured by Nippon Polyurethane Industry Co., Ltd.): | 19.8 parts by mass |

After that, 14.2 parts by mass of MEK oxime were dropped to the mixture under the following condition: the temperature of the reaction product was 50° C. Thus, a solution of Isocyanate Compound T having a weight-average molecular weight Mw of 58,000 and an average number of functional groups of 2.8 in butyl cellosolve was obtained.

<Synthesis of Polyether Polyurethane U Having Isocyanate Group at any One of its Terminals>

The following materials were subjected to a heating reaction under a nitrogen atmosphere at 80° C. for 2.5 hours. After that, 53.3 parts by mass of butyl cellosolve were added to the reaction product.

| | |
|---|---|
| Polypropylene glycol (trade name: Mn = 2,700; manufactured by Sigma-Aldrich Co.): | 100.0 parts by mass |
| Polymeric diphenylmethane diisocyanate (trade name: MILLIONATE MR-200; manufactured by Nippon Polyurethane Industry Co., Ltd.): | 24.3 parts by mass |

After that, 16.2 parts by mass of MEK oxime were dropped to the mixture under the following condition: the temperature of the reaction product was 50° C. Thus, a solution of Isocyanate Compound U having a weight-average molecular weight Mw of 40,000 and an average number of functional groups of 3.1 in butyl cellosolve was obtained.

<Synthesis of Polyether Polyurethane V Having Isocyanate Group at any One of its Terminals>

The following materials were subjected to a heating reaction under a nitrogen atmosphere at 80° C. for 2.5 hours. After that, 53.3 parts by mass of butyl cellosolve were added to the reaction product.

| | |
|---|---|
| Polypropylene glycol (trade name: Mn = 425; manufactured by Sigma-Aldrich Co.): | 100.0 parts by mass |
| Polymeric diphenylmethane diisocyanate (trade name: MILLIONATE MR-200; manufactured by Nippon Polyurethane Industry Co., Ltd.): | 69.6 parts by mass |

After that, 25.8 parts by mass of MEK oxime were dropped to the mixture under the following condition: the temperature of the reaction product was 50° C. Thus, a solution of Isocyanate Compound V having a weight-average molecular weight Mw of 40,000 and an average number of functional groups of 3.5 in butyl cellosolve was obtained.

<Synthesis of Polyether Polyurethane W Having Isocyanate Group at any One of its Terminals>

The following materials were subjected to a heating reaction under a nitrogen atmosphere at 80° C. for 2.5 hours. After that, 63.7 parts by mass of butyl cellosolve were added to the reaction product.

| | |
|---|---|
| Polypropylene glycol (trade name: Sannix PP-1000; manufactured by Sanyo Chemical Industries, Ltd.): | 100.0 parts by mass |
| 4,4'-diphenylmethane diisocyanate (trade name: Cosmonate PH; manufactured by Mitsui Chemicals Polyurethanes, Inc.) | 52 parts by mass |

After that, 24.2 parts by mass of MEK oxime were dropped to the mixture under the following condition: the temperature of the reaction product was 50° C. Thus, a solution of Isocyanate Compound W having a weight-average molecular weight Mw of 40,000 and a number of functional groups of 2 in butyl cellosolve was obtained.

<Synthesis of Polyether Polyurethane X Having Isocyanate Group at any One of its Terminals>

The following materials were subjected to a heating reaction under a nitrogen atmosphere at 80° C. for 2.5 hours. After that, 63.7 parts by mass of butyl cellosolve were added to the reaction product.

| | |
|---|---|
| Polytetramethylene glycol (trade name: PTG1000SN; manufactured by Hodogaya Chemical Co., Ltd.) | 100.0 parts by mass |
| Polymeric diphenylmethane diisocyanate (trade name: MILLIONATE MR-200; manufactured by Nippon Polyurethane Industry Co., Ltd.): | 48.7 parts by mass |

After that, 21.2 parts by mass of MEK oxime were dropped to the mixture under the following condition: the temperature of the reaction product was 50° C. Thus, a solution of Isocyanate Compound X having a weight-average molecular weight Mw of 40,000 and an average number of functional groups of 3.2 in butyl cellosolve was obtained.

Tables 4-1 and 4-2 below show the characteristics of Polyether Polyurethane Polyols E to K, and Polyether Polyurethanes Q to X each having an isocyanate group at any one of its terminals obtained in the foregoing.

TABLE 4-1

| | | No. | | | | | | |
|---|---|---|---|---|---|---|---|---|
| | | E | F | G | H | I | J | K |
| Diol compound | Number-average molecular weight (Mn) of PTMG | 250 | 1,000 | 1,000 | 2,000 | 1,000 | 700 (PPG) | 1,000 |
| | Chain-extending isocyanate | MDI | MDI | MDI | MDI | IPDI | MDI | MDI |
| | Weight-average molecular weight (Mw) of diol compound (a) | 8,000 | 6,000 | 15,000 | 12,000 | 10,000 | 8,000 | 10,000 |
| | Number of functional groups of diol compound (a) | 2.0 | 2.0 | 2.0 | 2.0 | 2.0 | 2.0 | 2.3 |

TABLE 4-2

| | | No. | | | | | | | |
|---|---|---|---|---|---|---|---|---|---|
| | | Q | R | S | T | U | V | W | X |
| Isocyanate compound | Number-average molecular weight (Mn) of PPG | 700 | 2,000 | 700 | 2,000 | 2,700 | 425 | 1,000 | 1,000 (PTMG) |
| | Chain-extending isocyanate | P-MDI | P-MDI | P-MDI | P-MDI | P-MDI | P-MDI | MDI | P-MDI |
| | Weight-average molecular weight (Mw) of isocyanate compound (b) | 23,000 | 63,000 | 26,000 | 58,000 | 40,000 | 40,000 | 40,000 | 40,000 |
| | Average number of functional groups of isocyanate compound (b) | 3.5 | 3 | 3.7 | 2.8 | 3.1 | 3.5 | 2 | 3.2 |

Comparative Examples 1 to 18

Developing rollers were each obtained in the same manner as in Example 1 except that the formulation of the paint for forming a surface layer in Example 1 was changed as shown in Table 5 below.

TABLE 5

| | Diol compound | | Isocyanate compound | | Carbon Black | |
|---|---|---|---|---|---|---|
| | No. | Parts by mass | No. | Parts by mass | No. | Parts by mass |
| Comparative Example 1 | E | 62 | N | 38 | *1 | 25 |
| Comparative Example 2 | F | 62 | N | 38 | *1 | 25 |
| Comparative Example 3 | H | 62 | N | 38 | *1 | 25 |
| Comparative Example 4 | G | 62 | N | 38 | *1 | 25 |
| Comparative Example 5 | I | 62 | N | 38 | *1 | 25 |
| Comparative Example 6 | J | 62 | N | 38 | *1 | 25 |
| Comparative Example 7 | K | 62 | N | 38 | *1 | 25 |
| Comparative Example 8 | D | 62 | W | 38 | *1 | 25 |
| Comparative Example 9 | D | 62 | U | 38 | *1 | 25 |
| Comparative Example 10 | D | 62 | R | 38 | *1 | 25 |
| Comparative Example 11 | D | 62 | T | 38 | *1 | 25 |
| Comparative Example 12 | D | 62 | X | 38 | *1 | 25 |
| Comparative Example 13 | D | 62 | S | 38 | *2 | 20 |
| Comparative Example 14 | D | 62 | Q | 38 | *3 | 15 |
| Comparative Example 15 | D | 62 | V | 38 | *4 | 23 |
| Comparative Example 16 | B | 62 | N | 38 | — | — |
| Comparative Example 17 | A | 62 | P | 38 | — | — |
| Comparative Example 18 | D | 62 | L | 38 | — | — |

(Image Evaluation)

Each of the developing rollers according to Examples 1 to 32 and Comparative Examples 1 to 18 obtained as described above was evaluated by the following methods.

<Evaluation for "Fog" Under Low-Temperature, Low-Humidity Environment (Temperature 10° C./Humidity 14% RH)>

Each of the developing rollers was evaluated with a color laser printer (trade name: LBP5300; manufactured by Canon Inc.). To be specific, the above developing roller was mounted on a magenta process cartridge for the above color laser printer. Prior to image output, the above process cartridge was mounted on the above color laser printer, and the resultant was left to stand under a test environment having a temperature of 10° C. and a humidity of 14% for 24 hours. After that, images each having a print percentage of 1% were continuously output on 17,000 sheets of recording paper under the test environment having a temperature of 10° C. and a humidity of 14% RH. It should be noted that the non-magnetic, one-component magenta developer mounted in the above magenta process cartridge was used as a developer without being treated. In addition, a Color Laser Copier (CLC) paper manufactured by Canon Inc. (A4 size, basis weight=81.4 g/m$^2$) was used as the recording paper. In this case, whether "fog" was occurring on the 17,000-th sheet was visually judged on the basis of the following criteria.

A: No "fog" is observed on the sheet.

B: Extremely slight "fog" is observed on the sheet.

C: "Fog" is observed on the sheet, but causes no problems in practical use.

<Evaluation for Adhesion of Developer Under High-Temperature, High-Humidity Environment (Temperature 40° C./Humidity 95% RH)>

Each of the developing rollers was evaluated with a color laser printer (trade name: LBP5300; manufactured by Canon Inc.). To be specific, each of the developing roller was mounted on a magenta process cartridge for the above color laser printer. It should be noted that, in an unused state of the process cartridge before use for the formation of an electrophotographic image, the developing roller in the process cartridge is in such a state as to contact a developing blade at all times with the non-magnetic, one-component magenta developer mounted in the cartridge interposed between the roller and the blade.

In addition, prior to the output of an electrophotographic image, the above color laser printer mounted with the above process cartridge was left to stand under an environment having a temperature of 40° C. and a humidity of 95% RH for 30 days. After that, the printer was left to stand under an environment having a temperature of 23° C. and a humidity of 50% RH for 24 hours. After that, halftone images were output on 20 sheets of recording paper under the former environment. The non-magnetic, one-component magenta developer mounted in the above magenta process cartridge was used without being treated in the formation of the electrophotographic images. In addition, a Color Laser Copier (CLC) paper manufactured by Canon Inc. (A4 size, basis weight=81.4 g/m$^2$) was used as the recording paper. In this case, whether banding occurred on a halftone image owing to the adhesion of the developer to the surface of the developing roller was visually judged on the basis of the following criteria.

A: No banding is observed on the image on the first sheet.

B: Banding is observed on the images on up to the first to fifth sheets. The banding disappears, and is not observed on the subsequent images.

C: The occurrence of banding is observed even on the images on the sixth to fifteenth sheets. The banding disappears, and is not observed on the subsequent images.

Table 6 shows the results of the image evaluation of the examples. In addition, Table 7 shows the results of the image evaluation of the comparative examples.

TABLE 6

| | Fog at 10° C. and 14% RH | Toner adhesion after standing for 30 days at 40° C. and 95% RH |
|---|---|---|
| Example 1 | A | A |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | A |
| Example 11 | A | A |
| Example 12 | A | A |
| Example 13 | A | A |
| Example 14 | A | A |
| Example 15 | A | A |
| Example 16 | A | A |
| Example 17 | A | A |
| Example 18 | A | A |
| Example 19 | A | A |
| Example 20 | A | A |
| Example 21 | A | A |
| Example 22 | A | A |
| Example 23 | B | A |
| Example 24 | B | A |
| Example 25 | B | A |
| Example 26 | B | A |
| Example 27 | B | A |
| Example 28 | B | B |
| Example 29 | B | B |
| Example 30 | B | A |
| Example 31 | B | A |
| Example 32 | B | A |
| Example 33 | A | A |
| Example 34 | A | A |

TABLE 7

| | Fog at 10° C. and 14% RH | Toner adhesion after standing for 30 days at 40° C. and 95% RH |
|---|---|---|
| Comparative Example 1 | C | A |
| Comparative Example 2 | C | A |
| Comparative Example 3 | C | C |
| Comparative Example 4 | C | C |
| Comparative Example 5 | C | C |
| Comparative Example 6 | C | C |
| Comparative Example 7 | C | B |
| Comparative Example 8 | C | C |
| Comparative Example 9 | C | C |
| Comparative Example 10 | C | C |
| Comparative Example 11 | C | B |
| Comparative Example 12 | C | C |
| Comparative Example 13 | C | B |
| Comparative Example 14 | C | B |
| Comparative Example 15 | C | B |
| Comparative Example 16 | C | C |
| Comparative Example 17 | C | C |
| Comparative Example 18 | C | C |

As is apparent from the results of Tables 6 and 7, the developing rollers of Examples 1 to 32 each exert an excellent balance between the performance under the low-temperature, low-humidity environment and the performance under the high-temperature, high-humidity environment; each of the developing rollers of Examples 1 to 22 exerted a particularly excellent balance. A developing roller obtained by thermally curing the polyol compound, isocyanate compound, and carbon black of the surface layer of the present invention was able to achieve excellent performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-143175, filed 30 May, 2008, which is hereby incorporated by reference herein in its entirety.

What is claimed is:

1. A method of producing a developing roller comprising a mandrel, a resin layer on an outer periphery of the mandrel, and a surface layer on an outer periphery of the resin layer, comprising a step of curing a mixture containing a carbon black, and the following components (a) and (b) and forming the surface layer:

(a) a diol obtained by a reaction between a polytetramethylene glycol having a number-average molecular weight of 650 or more and 1,000 or less and 4,4'-diphenylmethane diisocyanate, the diol having a weight-average molecular weight of 8,000 or more and 12,000 or less; and (b) an isocyanate compound obtained by a reaction between a polypropylene glycol (PPG) having a number-average molecular weight of 700 or more and 2,000 or less and polymeric diphenylmethane diisocyanate, the isocyanate compound having an isocyanate group at least at any one of its terminals, and the isocyanate compound having an average number of functional groups of 3.0 or more and 3.5 or less and a weight-average molecular weight of 25,000 or more and 60,000 or less.

2. A method of producing a developing roller according to claim 1, wherein a ratio of an amount of the component (b) to a total amount of the components (a) and (b) in the mixture is 32 mass % or more and 42 mass % or less.

3. A developing roller produced by the method according to claim 1.

4. A process cartridge which comprises an electrophotographic photosensitive member and a developing roller placed opposite to the electrophotographic photosensitive member and is formed to be detachably mountable on a main body of an electrophotographic apparatus, wherein the developing roller is one according to claim 3.

5. An electrophotographic image-forming apparatus, comprising an electrophotographic photosensitive member and a developing roller placed to be opposite to the electrophotographic photosensitive member, wherein the developing roller is one according to claim 3.

* * * * *